(12) United States Patent
Han et al.

(10) Patent No.: US 12,320,006 B2
(45) Date of Patent: Jun. 3, 2025

(54) METHOD FOR IMPROVING ANTI-FRICTION AND ANTI-WEAR PROPERTIES OF SUBSTRATE

(71) Applicant: CHINA UNIVERSITY OF PETROLEUM (EAST CHINA), Qingdao (CN)

(72) Inventors: Bin Han, Qingdao (CN); Chunyang Hu, Qingdao (CN); Xinhao Sun, Qingdao (CN); Meiyan Li, Qingdao (CN); Jialin Wang, Qingdao (CN); Chenxin Jia, Qingdao (CN); Xueda Li, Qingdao (CN); Yong Wang, Qingdao (CN)

(73) Assignee: CHINA UNIVERSITY OF PETROLEUM (EAST CHINA), Shangdong (CN)

( * ) Notice: Subject to any disclaimer, the term of this patent is extended or adjusted under 35 U.S.C. 154(b) by 0 days.

(21) Appl. No.: 18/729,639

(22) PCT Filed: Oct. 31, 2022

(86) PCT No.: PCT/CN2022/128506
§ 371 (c)(1),
(2) Date: Jul. 17, 2024

(87) PCT Pub. No.: WO2023/138145
PCT Pub. Date: Jul. 27, 2023

(65) Prior Publication Data
US 2024/0417859 A1    Dec. 19, 2024

(30) Foreign Application Priority Data
Jan. 20, 2022    (CN) .......................... 202210067675.2

(51) Int. Cl.
*B23K 26/342*    (2014.01)
*C23C 8/02*    (2006.01)
(Continued)

(52) U.S. Cl.
CPC .......... *C23C 24/087* (2013.01); *B23K 26/342* (2015.10); *C23C 8/02* (2013.01); *C23C 8/36* (2013.01)

(58) Field of Classification Search
CPC .. C23C 8/36; C23C 8/38; B23K 24/34; B23K 24/342
See application file for complete search history.

(56) References Cited

FOREIGN PATENT DOCUMENTS

| CN | 102732880 A | 10/2012 |
|---|---|---|
| CN | 102839373 A | 12/2012 |

(Continued)

OTHER PUBLICATIONS

Bhaduri et al. "On Design and Tribological Behavior of Laser Textured Surfaces", Procedia CIRP, vol. 60, pp. 20-25, 2017 (Year: 2017).*

(Continued)

*Primary Examiner* — Lois L Zheng
(74) *Attorney, Agent, or Firm* — SZDC Law PC

(57) ABSTRACT

The present invention discloses a method for improving the anti-friction and anti-wear properties of substrate, and relates to the technical field of friction and wear. The method of present invention is to firstly clad alloy powder on the surface of substrate to form the cladding layer, and then perform the texturing and sulfurization treatment in sequence on the cladding layer to form a textured and ion-sulfurized cladding layer with anti-friction and anti-wear properties on the surface of substrate, so as to improve anti-friction and anti-wear properties of the substrate, and to increase efficiency as well as service life of the substrate.

3 Claims, 10 Drawing Sheets

(51) Int. Cl.
    *C23C 8/36*         (2006.01)
    *C23C 24/08*      (2006.01)

(56) References Cited

FOREIGN PATENT DOCUMENTS

| CN | 107236950 | A |   | 10/2017 |          |
|----|-----------|---|---|---------|----------|
| CN | 109252162 | A |   | 1/2019  |          |
| CN | 113445043 | A |   | 9/2021  |          |
| CN | 114250464 | A | * | 3/2022  | B22F 9/04 |
| CN | 114395761 | A |   | 4/2022  |          |

OTHER PUBLICATIONS

Baosen Zhang et al, "Friction reduction and anti-wear performance of MoS2 film coated on laser textured surface." Hot Working Technology 2015 vol. 44 No. 2, pp. 150-158 (Jan. 31, 2015).

* cited by examiner

METHOD FOR IMPROVING ANTI-FRICTION AND ANTI-WEAR PROPERTIES OF SUBSTRATE

This application is the National Stage Application of PCT/CN2022/128506, filed on Oct. 31, 2022, which claims priority to Chinese Patent Application No. CN 202210067675.2, filed on Jan. 20, 2022, which is incorporated by reference for all purposes as if fully set forth herein.

TECHNICAL FIELD

The present invention relates to the technical field of friction and wear, and in particular to a method for improving the anti-friction and anti-wear properties of substrate.

TECHNICAL BACKGROUND

The wear caused by friction is the main cause of mechanical equipment failure. Currently, about 80% of parts damage worldwide is caused by various forms of wear. Ion sulfurization is the new sulfurization technology independently developed in China and is in-situ synthesis process. It is known as the green sulfurization technology because of its energy saving as well as pollution-free nature and can achieve low-temperature sulfurization. However, large radius of sulfur atoms makes it difficult to diffuse in the metal, so the sulfurized layer is commonly thin which makes it easy to wear during the service. Its anti-friction effect as well as service life still need to be further improved. Therefore, seeking more effective method for anti-friction as well as anti-wear based on sulfurization technology is an important issue to be faced in the present technical field.

SUMMARY OF THE INVENTION

The present invention provides a method for improving anti-friction as well as anti-wear properties of the substrate. The method comprises the steps of firstly cladding alloy powder on the surface of substrate to form cladding layer, and then performing micro-texturing and sulfurization treatment in sequence on cladding layer to form micro-textured and ion-sulfurized cladding layer with anti-friction and anti-wear properties on the surface of substrate, so as to improve anti-friction and anti-wear properties of the substrate.

In the present invention, micro-texturing is performed on surface of cladding layer to form texture pattern which is pit array or parallel groove. The diameter of pit in the pit array is 100 to 500 μm, and circle-center distance is 150 to 1500 μm; the width of parallel groove is 50 to 200 μm, and the center distance is 50 to 500 μm.

In the present invention, micro-texturing process is carried out in the laser marking machine. The pit array is textured in following manner: marking speed from 100 to 1000 mm/s, power from 5 to 20 W, filling radius from 0.001 to 0.05 mm, marking number from 1 to 10 times, jumping speed at 3000 mm/s, Q frequency at 25 khz as well as Q release at 1 μs. The parallel groove is textured in following manner: marking speed from 100 to 1000 mm/s, power from 5 to 20 W, marking number from 1 to 10 times, jumping speed at 3000 mm/s, Q frequency at 25 khz as well as Q release at 1 μs.

Before micro-texturing treatment, the surface of cladding layer may be grinded, preferably using sandpaper for grinding, and more preferably using 600, 1000, 1500 and 2000 grit sandpaper in sequence for grinding.

In the present invention, cladding is selected from laser cladding which its parameters are: laser power from 1500 to 5000 W, cladding speed from 200 to 800 mm/min as well as overlapping rate from 20 to 50%. Before cladding, the surface of substrate can be preferably grinded to remove the oxide scale.

In the present invention, the alloy powder includes but is not limited to high-entropy alloy, nickel-based alloy, iron-based alloy, cobalt-based alloy as well as other alloy powders commonly used for laser cladding. During the cladding process, thickness of alloy powder is preferably from 0.8 to 2 mm.

In the present invention, the high-entropy alloy can be selected from the multi-component high-entropy alloy containing sulfide-generating elements with anti-friction property.

In the present invention, sulfurization treatment adopts ion sulfurization method and its parameters are: voltage from 520 to 750V, holding temperature from 210 to 290° C., $H_2S$ gas flow rate from 20 to 30 sccm and holding time from 2 to 3 h.

In the process of marking and constructing micro-textures, oxides and raised burrs will be formed on the surface of texture pattern due to ablation. Therefore, the texture pattern needs to be grinded before sulfurization treatment to eliminate craters or burrs. The grinding can preferably be completed with 2000 grit sandpaper.

The present invention provides a product with anti-friction as well as anti-wear properties which comprises the substrate and the micro-textured as well as ion-sulfurized layer prepared on the surface of substrate. The micro-textured and ion-sulfurized layer is prepared on the surface of substrate by the following method: Firstly, alloy powder is clad on the surface of substrate to form cladding layer, and then the cladding layer is subjected to the micro-texturing and sulfurization treatment in sequence to form micro-textured and ion-sulfurized layer with anti-friction and anti-wear properties on the surface of substrate.

The above-mentioned product with the anti-friction as well as anti-wear properties can be the metal workpiece such as high-pressure plunger, hydraulic support, sliding bearing, low-speed transmission gear, stamping die, and rock drill piston or cylinder sleeve.

In the present invention, the substrate is selected from metal materials including but not limited to the steel or nonferrous metals. The steel can be selected from carbon structural as well as low alloy structural steel (Q195, Q215A, Q215B, Q235A, Q235B or Q235C etc.), high-quality carbon structural steel as well as high-quality carbon spring steel (08F, 20, 20A, 45, 45E or 65Mn etc.), alloy structural steel as well as alloy spring steel (20CrMnSi, 35CrMo or 60Si2Mn etc.), tool steel, bearing steel and stainless steel (2Cr13 or 1Cr18Ni9) etc. Nonferrous metals can be selected from titanium alloys, aluminum alloys or copper alloys etc.

The beneficial effects of the present invention are as follows:

The present invention utilizes surface-texturing technology to construct micro-texture on the surface of laser cladding alloy layer, and adopts ion sulfurization process to in-situ synthesize the multi-sulfide solid lubricating film layer on its surface, ingeniously combining the preparation of the ion-sulfurized multi-sulfide with the surface micro-texturing technology, thereby obtaining composite solid lubricating film layer with low friction coefficient as well as long service life. The ion sulfurization as well as surface micro-texturing technology are combined to achieve synergistic effect. The micro-texturing treatment of the surface before ion sulfurization can greatly increase effective thickness and area of the sulfurized layer, thereby effectively increasing the working life of sulfurized layer, and sulfurized layer as well as texture play synergistic role in anti-friction and lubrication. At the same time, the presence of texture can improve the bonding force between solid lubricating film and surface, and sulfurized layer can reduce stress concentration in the edge area of texture and protect integrity of texture on the surface. The method of the present invention can effectively improve anti-friction and anti-wear properties of the substrate, thereby increasing the efficiency and service life of the substrate.

DETAILED DESCRIPTION OF THE EMBODIMENTS

Figure 1:
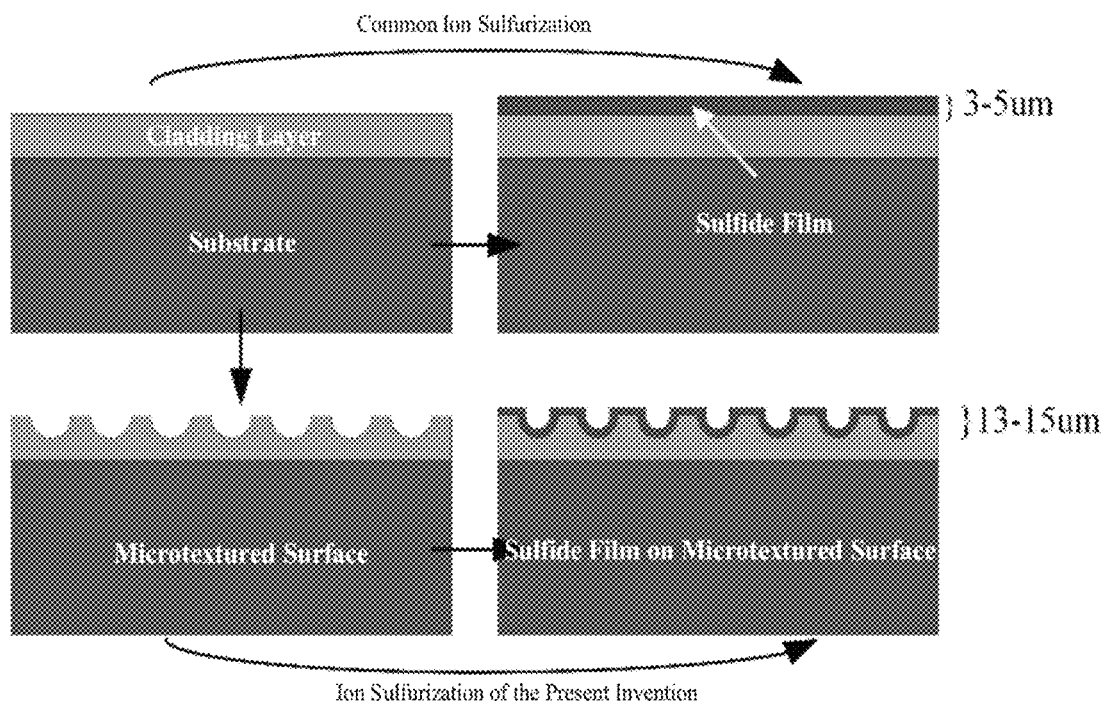
FIG. 1 is a schematic diagram of micro-textured ion sulfurization process.

Compared with common ion sulfurization process, the present invention further performs micro-texturing treatment to the substrate before ion sulfurization process is implemented. In order to intuitively show difference between micro-texturized ion sulfurization process and common ion sulfurization process, the present invention provides FIG. 1 for basic display and understanding.

In following content, the present invention only takes CoCrFeNiMo high-entropy alloy as well as SD-Ni45 metal-ceramic alloy as examples to demonstrate the cases of embodiment, but the scope of embodiment of the present invention is not limited thereto. The high-entropy alloy of the present invention is not limited to high-entropy alloy formed by combination of metal elements such as Co, Cr, Fe, Ni, and Mo, but can also be high-entropy alloy formed by combination of other metal elements such as Cu, Zn, etc. and any of these above-mentioned metal elements. The metal-ceramic alloy of the present invention is not limited to nickel-based alloy (SD-Ni45), but can also be iron-based alloy or cobalt-based alloy etc. commonly used in laser cladding.

The powder of CoCrFeNiMo high-entropy alloy used in the present invention is prepared by the following method: the atomized powder CoCrFeNi as well as the elemental powder Mo are uniformly mixed in a molar ratio of 1:1, and then are dried as well as dehumidified at 120° C. to obtain CoCrFeNiMo high-entropy alloy powder.

The powder of SD-Ni45 metal-ceramic alloy used in the present invention has a diameter of 48 to 100 μm, and chemical composition of the powder is as shown in Table 1:

TABLE 1

Chemical composition of SD-Ni45 alloy powder (Mass Fraction, %)

| | | | Element | | | | |
|---|---|---|---|---|---|---|---|
| C | W | Mo | B | Si | Cr | Fe | Ni |
| Content 1.150 | 14.976 | 0.410 | 2.088 | 2.506 | 14.986 | 17.220 | 46.664 |

The substrate used in invention is Q235 steel (with size of about 100 mm×50 mm×10 mm), and its surface needs to be grinded with a grinder to remove oxide scale before laser cladding.

The laser cladding of the present invention is carried out in HWF60 composite welding robot workstation under the argon protection. The laser output by the IPG YLS-6000 fiber laser is transmitted via optical fiber to a rectangular spot cladding head fixed on a FANUC robot (model R-1000iA/100F).

The present invention adopts the YLP-MP20 laser marking machine to prepare the surface micro-texturing. The laser is mainly composed of an IPG MOPA fiber laser, a main control system, a software operating system and a ScanLab galvanometer from Germany. The laser outputs a laser beam with wavelength of 1064 nm during the operation, and after the beam is expanded by a beam expander and reflected by a galvanometer, the laser beam is moved on a two-dimensional plane under action of a control system, and the laser beam is focused by a focusing lens, and then a fine high-energy spot is formed on the surface of the sample so that the to-be-processed surface can be instantly vaporized, and the sample surface is radiated point by point according to a pre-set pattern, and finally a texture morphology with a certain depth and width can be formed.

The present invention adopts LDMC-15A pulsed ion sulfurizing furnace to carry out the low-temperature ion sulfurization.

The present invention adopts TIME6610M semi-automatic microhardness tester in order to measure microhardness of the cross-section of the sample of cladding layer, loads 1.96N, holds the load for 15 s, tests once every 0.1 mm from the surface of the sample of cladding layer vertically downward to the substrate, and takes the average value after three columns were tested.

The present invention uses PHI-Versaprobe 5000 III X-ray photoelectron spectrometer to perform XPS analysis on the sulfurized sample. The X-ray source is a monochromatic AlKa source with energy at 1486.6 eV, voltage at 15 kV and beam current at 4.5 mA.

The present invention makes use of Zeta-20 surface profiler to observe three-dimensional morphology of texture surface of the cladding layer.

Unless otherwise specified, scientific as well as technical terms used in present invention have the meanings generally understood by person skilled in the art. The present invention will be further described in detail below with the reference to specific embodiments and data. It should be understood that the exemplary embodiments discussed herein are for illustrative purposes, and that modified and alternative embodiments may be implemented without departing from the scope of the present invention.

Embodiment 1

The preparation steps of the micro-textured as well as ion-sulfurized CoCrFeNiMo high-entropy alloy cladding layer are as follows:

(1) Laser Cladding

The powder of CoCrFeNiMo high-entropy alloy is laid evenly with thickness of 2 mm on surface of Q235 steel for laser cladding. The laser cladding conditions are as follows: laser power at 1800 W, cladding speed at 300 mm/min, overlapping rate at 30%, spot size at 10 mm×1 mm and protective gas amount at 4 L/min. After each time of cladding, another layer of powder is laid on the overlapping part, and finally a cladding layer with thickness of about 1 mm is formed. After the sample of cladding layer was air-cooled to the room-temperature, impurities such as oxidized slag on the surface are removed with a grinder.

Figure 2:
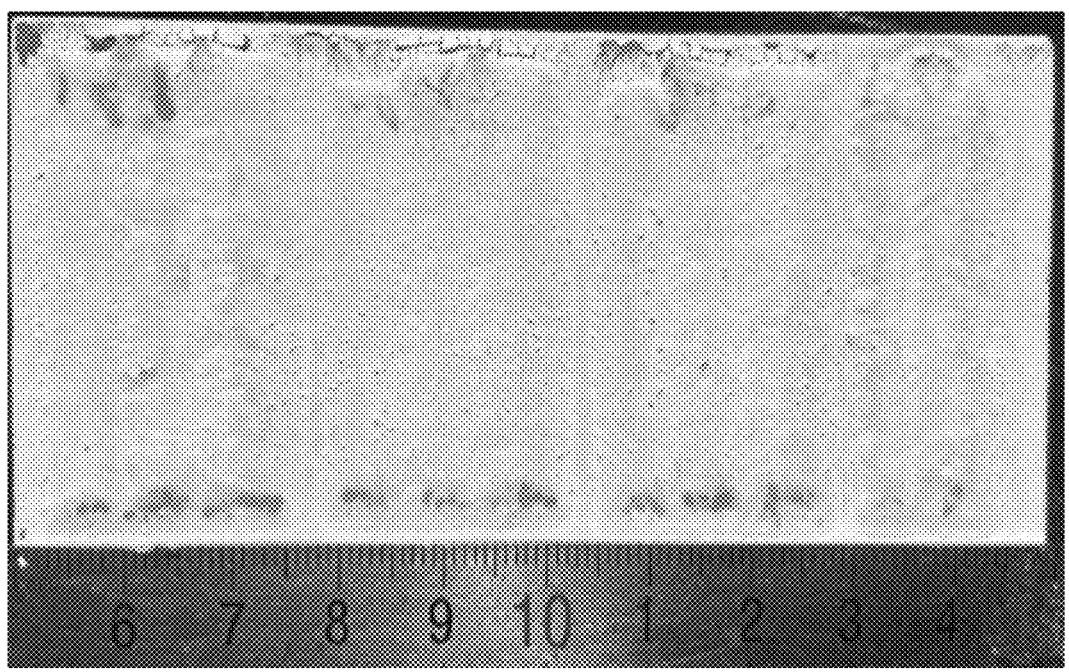
FIG. 2 is an image of dye penetrant testing of CoCrFeNiMo high-entropy alloy cladding layer on the surface of Q235 steel.
Figure 3:
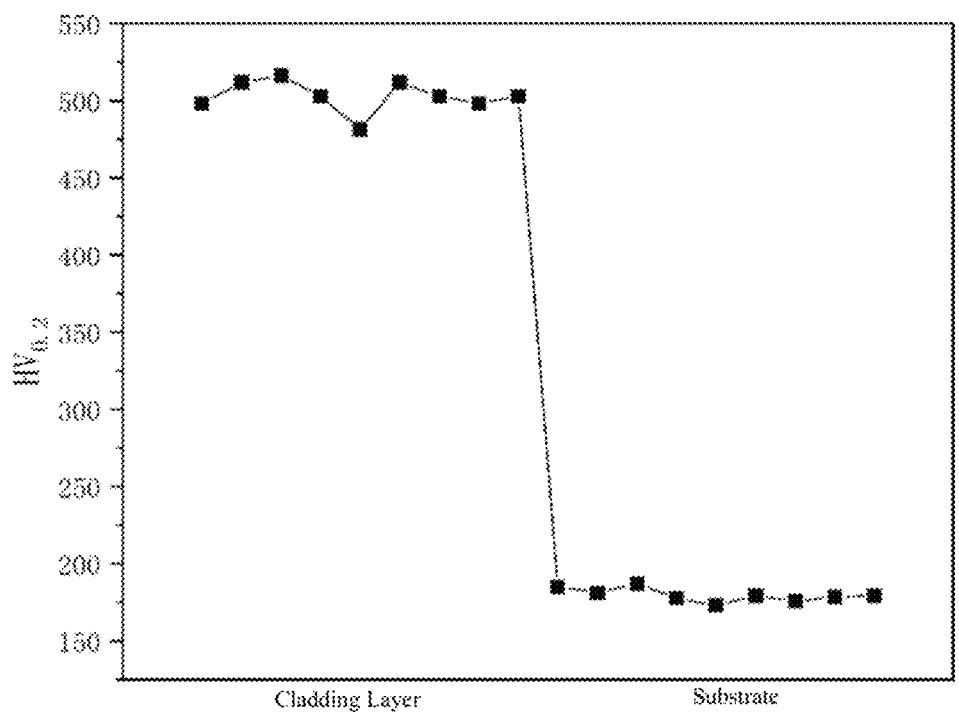
FIG. 3 is an analysis chart of cross-sectional hardness of the CoCrFeNiMo high-entropy alloy cladding layer.

The sample of cladding layer is subjected to dye penetrant testing. As is shown in FIG. 2, the powder of CoCrFeNiMo high-entropy alloy is well formed after cladding. There is no red color reaction when testing agent is used to detect it which indicates that the cladding layer has no cracks and thus no flaw detection defects. This shows that the high-entropy alloy prepared by the present invention has a high advantage in composition and formulation. After the cross-sectional hardness of the sample of cladding layer is tested, the results are shown in FIG. 3. The hardness of the high-entropy alloy layer on surface of the substrate after cladding can be several times higher than that of the substrate.

(2) Texturing Treatment

After no defect is found by the penetrant testing, sample of the cladding layer is cut into samples of the required size (15 mm×15 mm×10 mm) using wire cut electric discharge machine, and then the samples are grinded as well as polished using 600, 1000, 1500 and 2000 grit sandpaper in sequence, placed in anhydrous ethanol for ultrasonic cleaning for 30 min and then blown dry for later use.

The pit texture and groove texture are constructed on sample surface of different cladding layer. Marking parameters of pit texture are: diameter at 200 μm, circle-center distance at 600 μm, surface density at 8.727%, power at 17 W, marking speed at 200 mm/s, filling radius at 0.005 mm, marking number at 1 time, jumping speed at 3000 mm/s, Q frequency at 25 khz, Q release at 1 μs. Based on above-mentioned parameters, texture pattern is formed which is a uniformly distributed pit array. The marking parameters of groove texture are: width at 60 μm, center distance at 400 μm, surface density at 15%, power at 16 W, marking speed at 400 mm/s, marking number at 5 times, jumping speed at 3000 mm/s, Q frequency at 25 khz, Q release at 1 μs. Based on above-mentioned parameters, texture pattern is formed which is a parallel groove.

Figure 4:
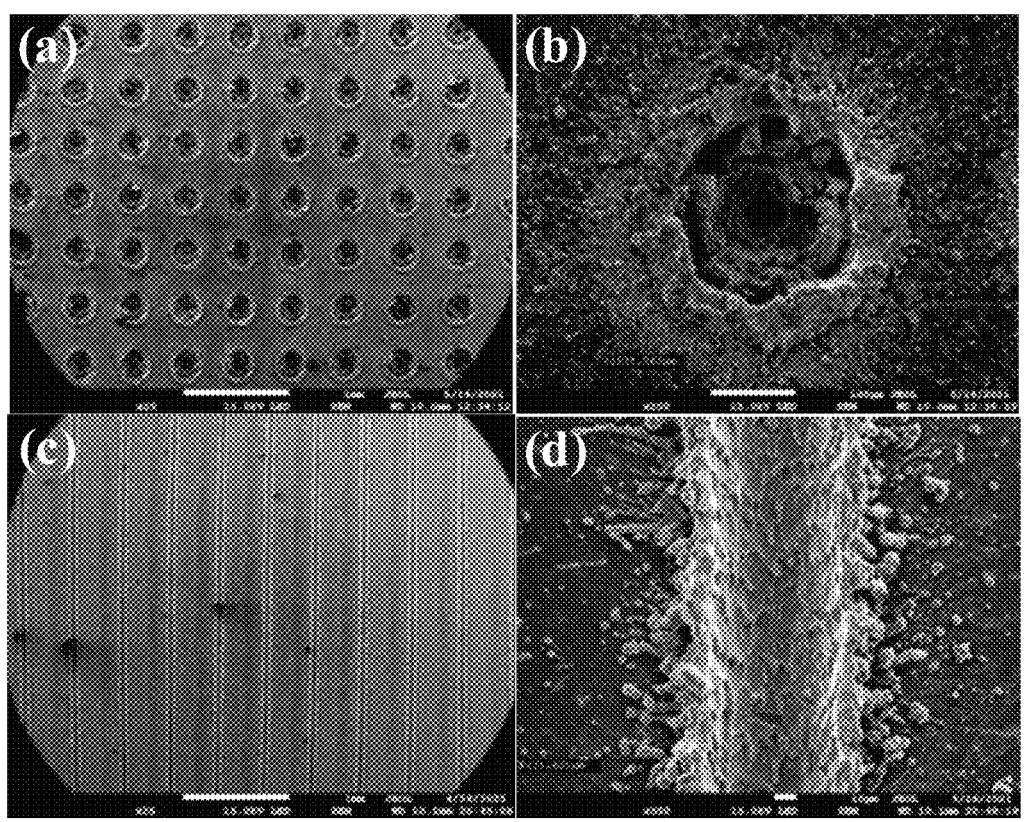
FIG. 4 is SEM images of pit texture as well as groove texture of the CoCrFeNiMo high-entropy alloy cladding layer before sulfurization, wherein (a) is a low-magnification SEM image of pit texture, (b) is a high-magnification SEM image of pit texture, (C) is a low-magnification SEM image of groove texture, and (d) is a high-magnification SEM image of groove texture.
Figure 5:
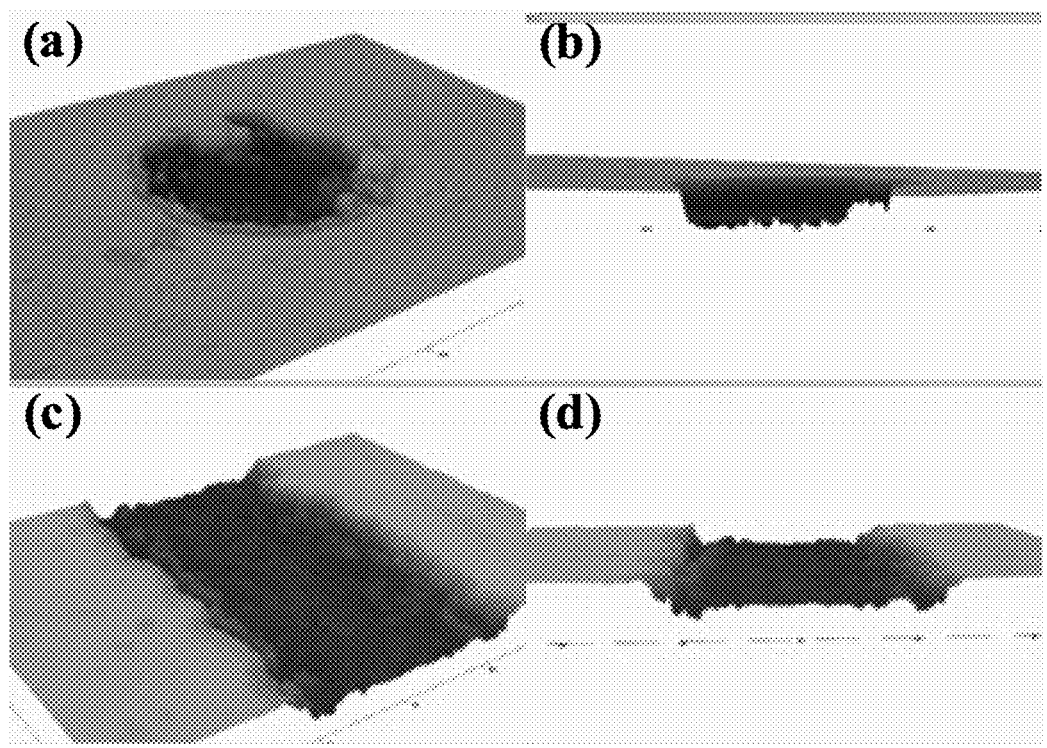
FIG. 5 is the three-dimensional morphologies of pit texture as well as groove texture of the CoCrFeNiMo high-entropy alloy cladding layer before the sulfurization, wherein (a) is a front view of the three-dimensional morphology of pit texture, (b) is a side view of the three-dimensional morphology of pit texture, (c) is a front view of three-dimensional morphology of groove texture, and (d) is a side view of three-dimensional morphology of groove texture.
Figure 6:
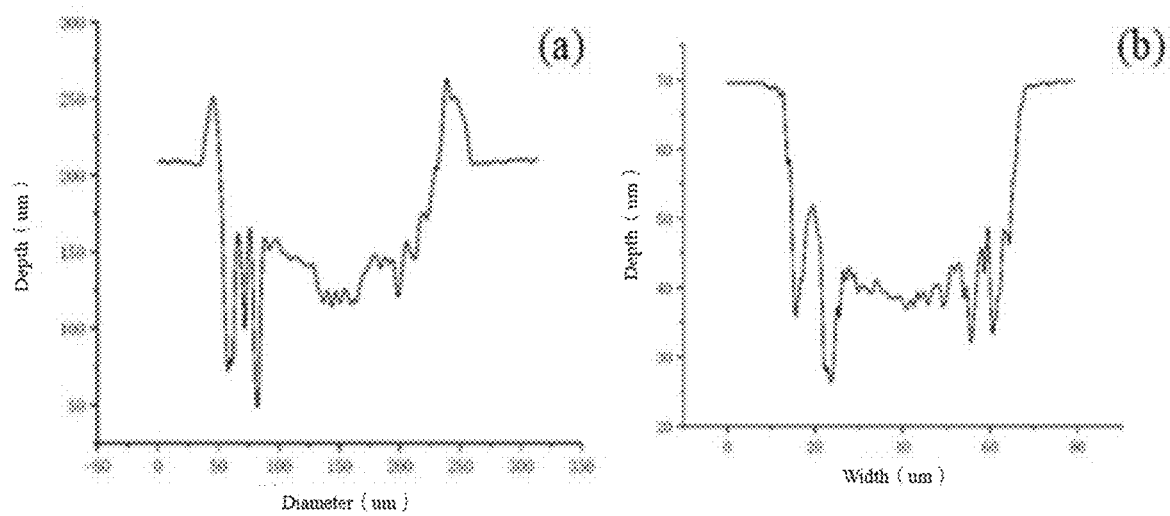
FIG. 6 is a data graph relates to cross-sectional profile of pit texture and groove texture of the CoCrFeNiMo high-entropy alloy cladding layer before the sulfurization, wherein (a) is a (depth) diagram relates to cross-sectional profile of pit texture, and (b) is a (depth) diagram relates to cross-sectional profile of groove texture.

The pit texture and the groove texture are as shown in FIG. 4. There are craters as well as burrs on surface of cladding layer. The three-dimensional morphology of the pit texture and groove texture is as shown in FIG. 5, and the cross-sectional profile (in depth) of the pit texture and groove texture is as shown in FIG. 6. It can be seen from FIGS. 5 and 6 that texturing treatment can cause physical changes to surface of the cladding layer. The pit or groove formed can not only increase the sulfurization area and sulfurization thickness of surface of the cladding layer, but can also store wear debris and lubricating medium, reduce the wear of abrasive particles on the friction pair, and prevent the loss of lubricating medium.

Figure 7:
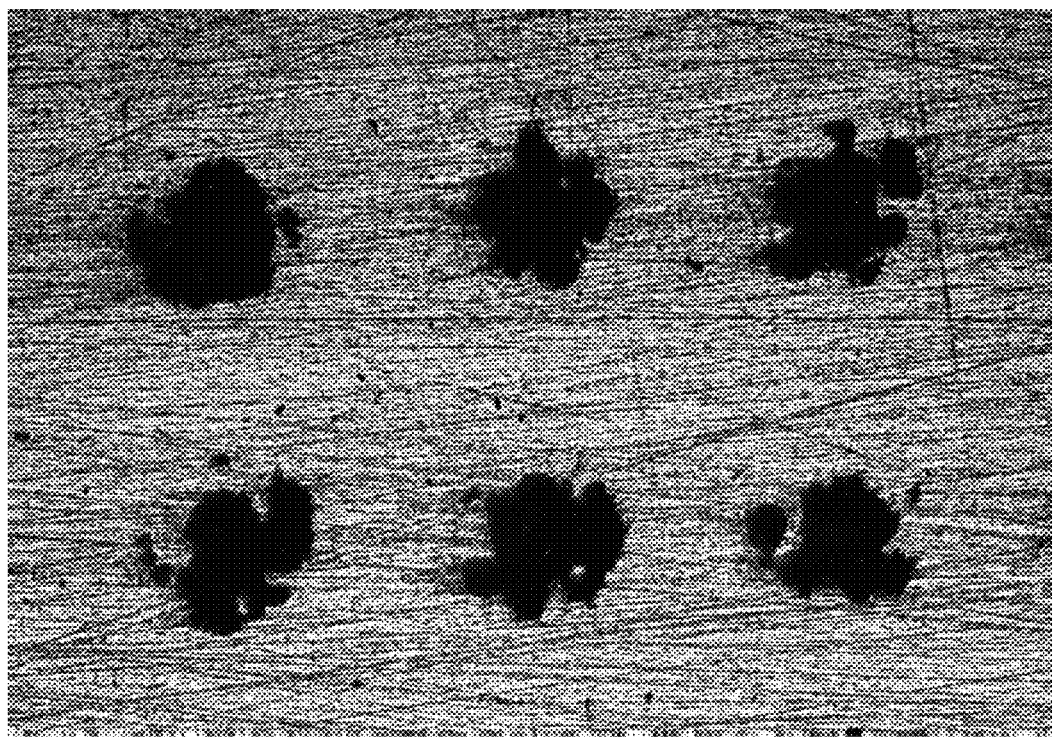
FIG. 7 is a texture pattern of the pit after grinding with sandpaper.

The texture pattern is lightly grinded as well as polished in a single direction using 2000 grit sandpaper to eliminate the craters as well as burrs on the surface of the cladding layer, and is ultrasonically cleaned in anhydrous ethanol for 30 min to remove the residual polishing paste, oil stains and other stains on surface, and then is dried for use. The pattern of pit texture after grinding is as shown in FIG. 7. After grinding, the craters on surface of the cladding layer will be smoothed and the burrs will be disappeared.

(3) Sulfurization Treatment

The sample of cladding layer after the above-mentioned texturing treatment is subjected to sulfurization treatment. The parameters of sulfurization treatment are: voltage at 660V, holding temperature at 280° C., $H_2S$ gas flow rate at 24 sccm, and holding time at 2 h. After the sulfurization treatment, the micro-textured as well as ion-sulfurized CoCrFeNiMo high-entropy alloy cladding layer will be obtained.

Figure 8:
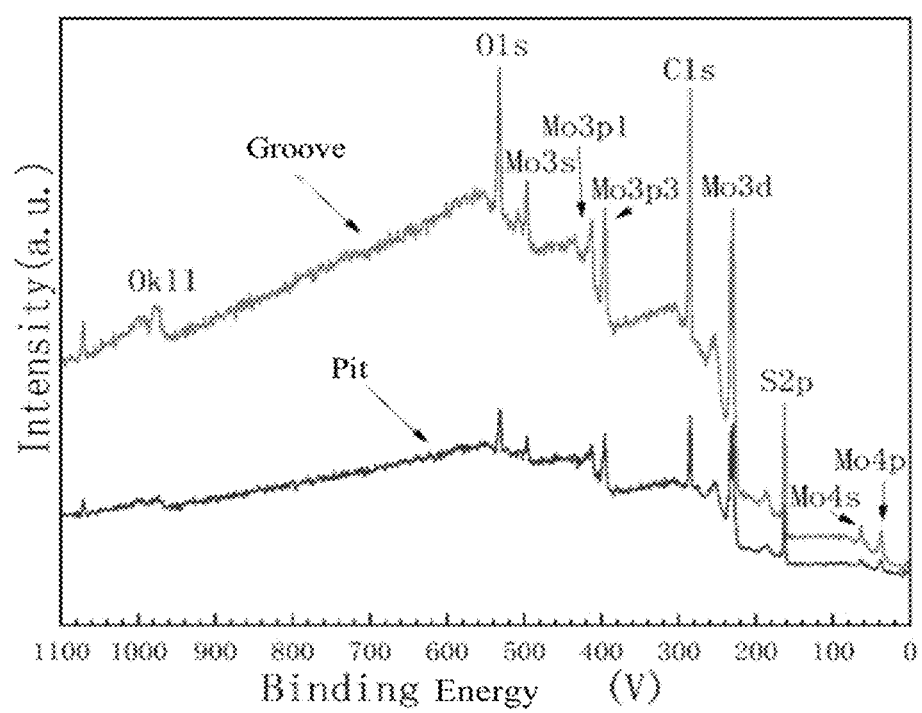
FIG. 8 is an XPS analysis diagram relates to the internal material of pit texture and groove texture of the CoCrFeNiMo high-entropy alloy cladding layer after the sulfurization.
Figure 9:
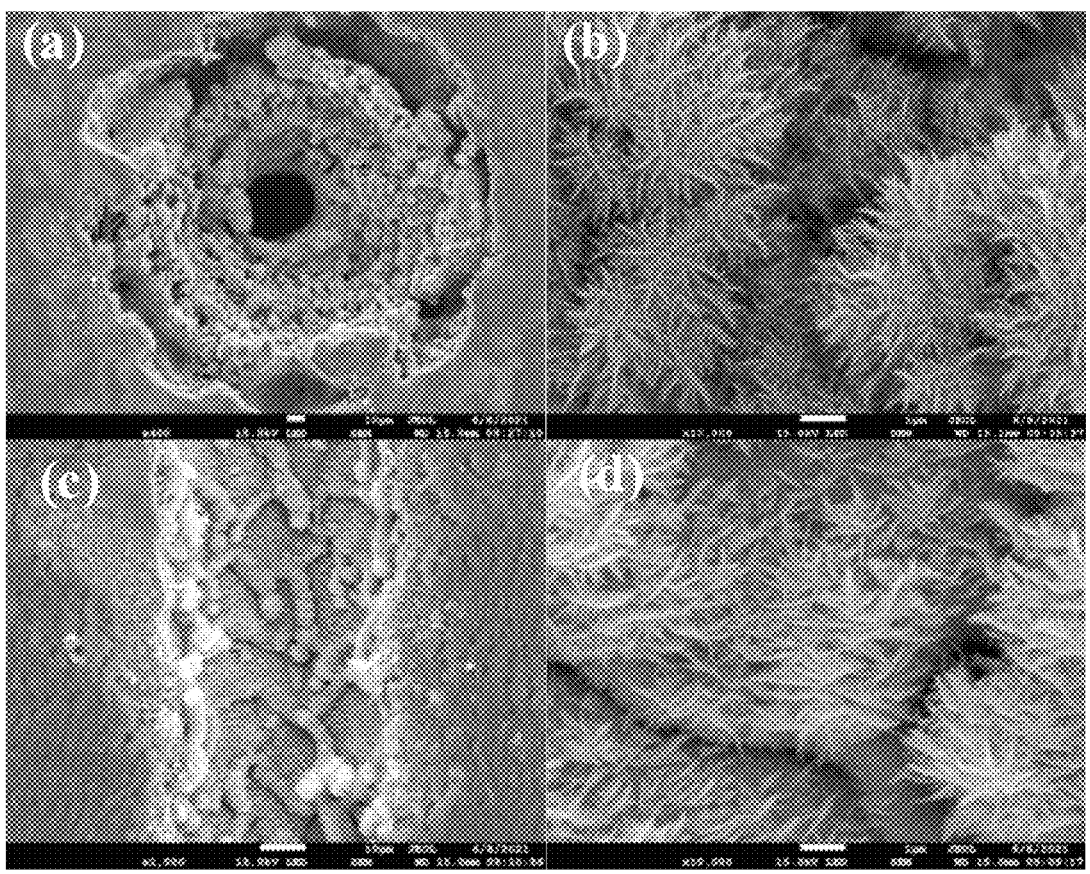
FIG. 9 is SEM images of pit texture as well as groove texture of the CoCrFeNiMo high-entropy alloy cladding layer after sulfurization, wherein (a) is a low-magnification SEM image of pit texture, (b) is a high-magnification SEM image of pit texture, (c) is a low-magnification SEM image of groove texture and (d) is a high-magnification SEM image of groove texture.

The XPS element analysis of the internal material of the pit texture and the groove texture is as shown in FIG. 8. The pit texture and the groove texture contain the sulfides such as $MoS_2$ and MoS which proves success of the sulfurization treatment. The SEM image of pit texture and groove texture after sulfurization is as shown in FIG. 9. Fluffy substance appears inside the pit texture and the groove texture which can be verified with FIG. 8 to confirm that this fluffy substance in the pit texture and the groove texture are the sulfides (main substance of the sulfurized layer), which can further verify that combination of texturing as well as sulfurization can cause a huge change in the physical structure of the cladding layer which is beneficial to improvement of anti-wear property.

Embodiment 2

The preparation steps of micro-textured as well as ion-sulfurized SD-Ni45 metal-ceramic alloy cladding layer are as follows:

(1) Laser Cladding

The dried powder of SD-Ni45 metal-ceramic alloy is placed in a powder feeder and evenly fed to surface of Q235 steel through a prepositive powder feeding nozzle for laser cladding. The conditions of laser cladding are: laser power at 2500 W, cladding speed at 200 mm/min, overlapping rate at 30%, spot size at 10 mm×1 mm, protective gas amount at 5 L/min, powder feeding amount at 20 g/min, powder feeding gas amount at 11 L/min, and finally cladding layer with thickness of about 1 mm can be formed. After sample of the cladding layer is air-cooled to room temperature, impurities such as oxide slag on the surface will be removed with a grinder.

Figure 10:
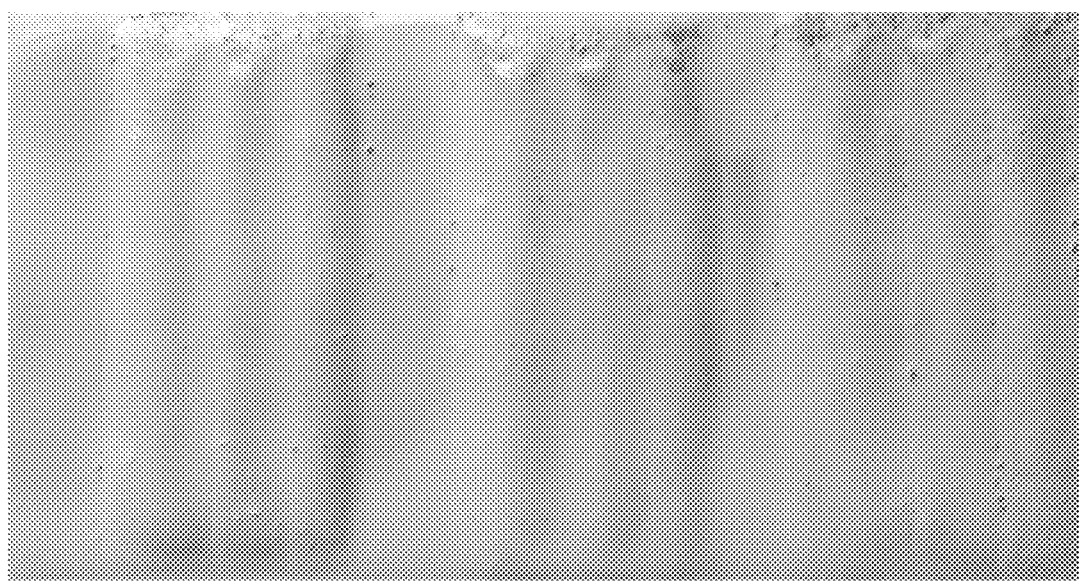
FIG. 10 is an image of dye penetrant testing of the SD-Ni45 metal-ceramic alloy cladding layer on the surface of Q235 steel.
Figure 11:
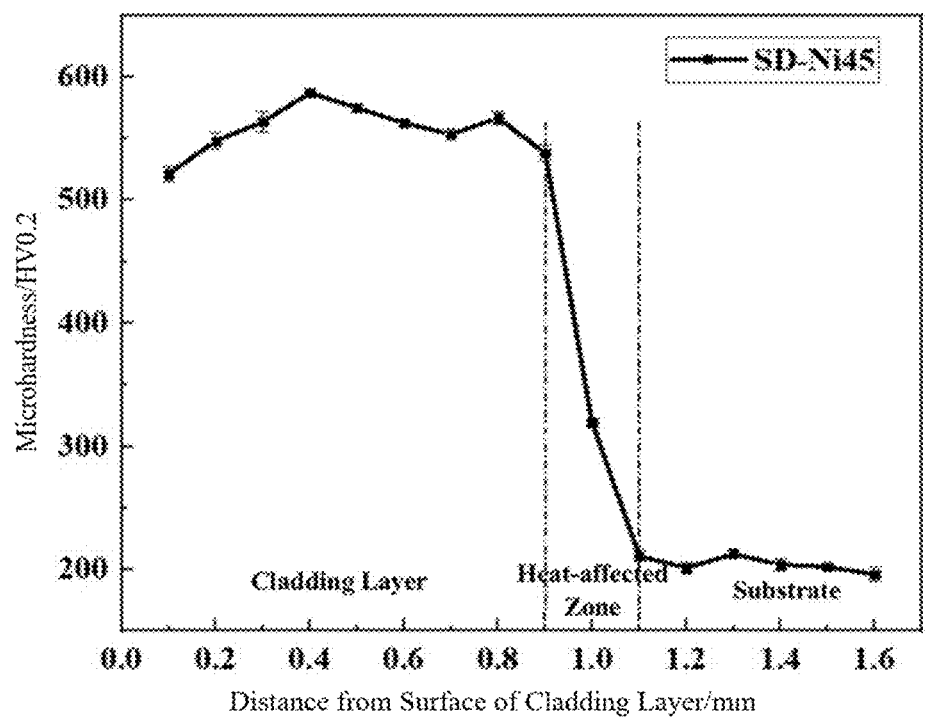
FIG. 11 is an analysis diagram relates to the testing of cross-sectional hardness of the SD-Ni45 metal-ceramic alloy cladding layer.

The sample of the cladding layer is subjected to dye penetrant testing. As is shown in FIG. 10, SD-Ni45 metal-ceramic alloy cladding layer is well formed, and there is no red color reaction when testing agent is used to detect it which indicates that the cladding layer has no cracks and thus no flaw detection defects. This shows that metal-ceramic alloy prepared by present invention has a high advantage in the composition and formulation. After the cross-sectional hardness of the sample of cladding layer is tested, the results are as shown in FIG. 11. The hardness of the metal-ceramic alloy layer on surface of the substrate after cladding can be several times higher than that of the substrate, and the average hardness of the cladding layer can reach 550HV0.2

(2) Texturing Treatment

After no defect is found by the penetrant testing, sample of the cladding layer is cut into samples of the required size (15 mm×15 mm×10 mm) using wire cut electric discharge machine, and then the samples are grinded as well as polished using 600, 1000, 1500 and 2000 grit sandpaper in sequence, placed in anhydrous ethanol for ultrasonic cleaning for 30 min and then blown dry for later use.

The pit texture is constructed on surface of the sample of the cladding layer. The marking parameters are: diameter at 300 μm, circle-center distance at 1123.498 μm, surface density at 5.60%, power at 16 W, marking speed at 400 mm/s, filling radius at 0.01 mm, marking number at 5 times, jumping speed at 3000 mm/s, Q frequency at 25 khz, Q release at 1 μs. Based on above-mentioned parameters, texture pattern is formed which is a uniformly distributed pit array.

Figure 12:
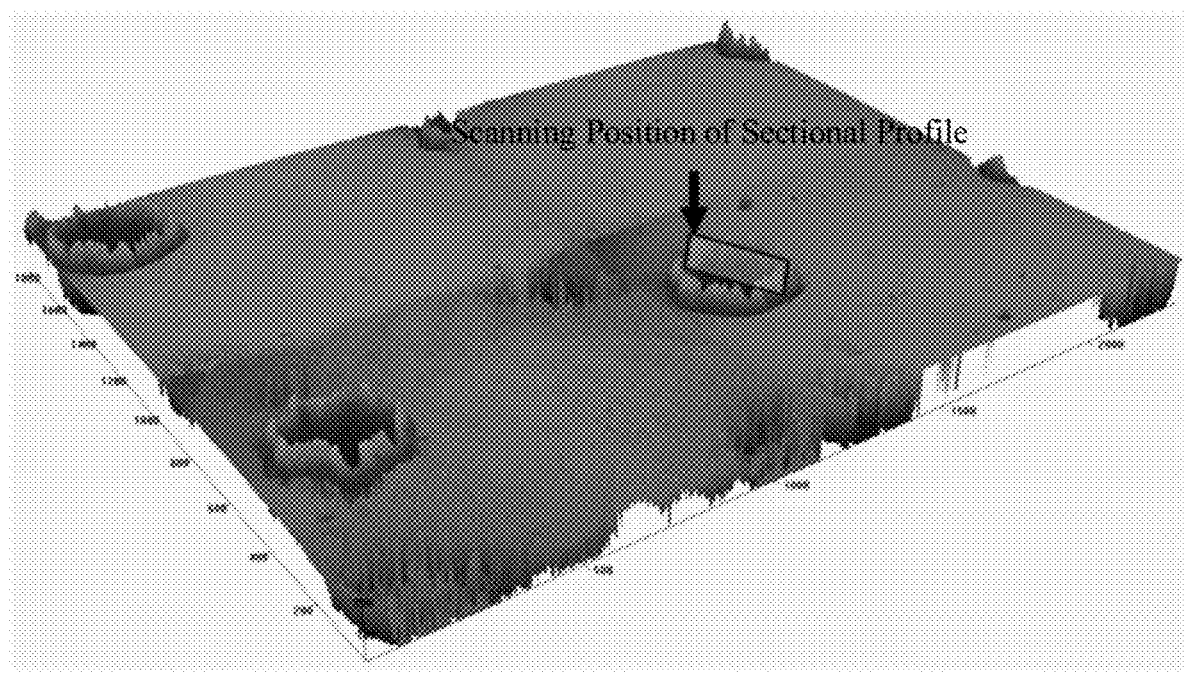
FIG. 12 is a three-dimensional morphology of pit texture of the SD-Ni45 metal-ceramic alloy cladding layer before sulfurization.
Figure 13:
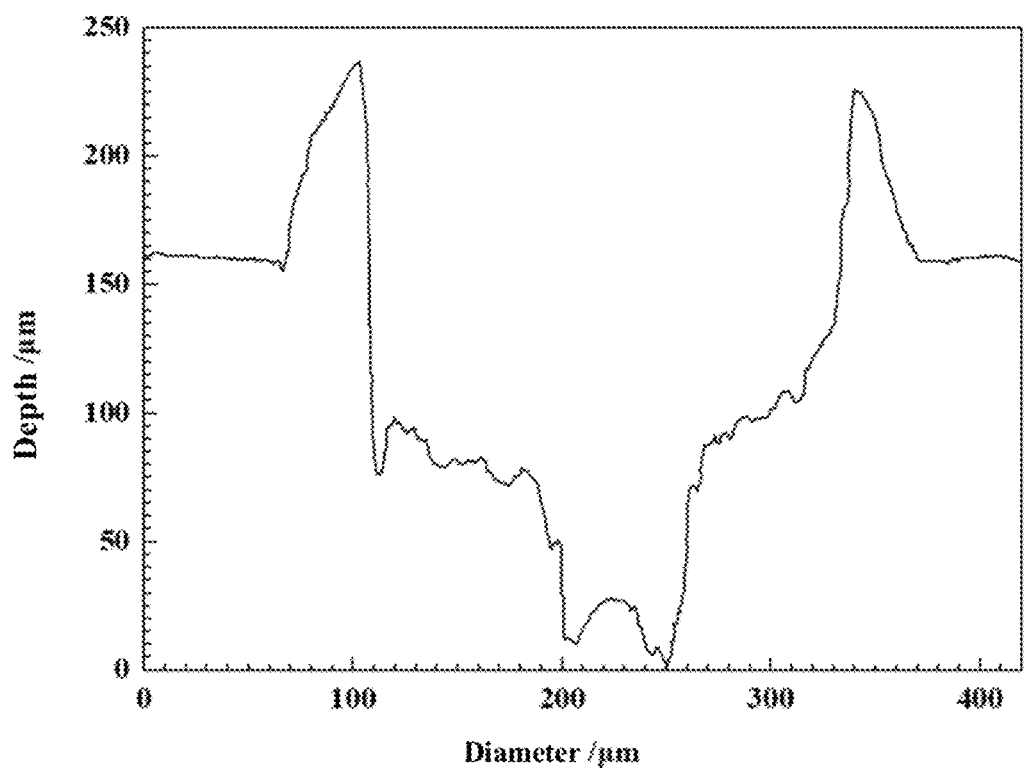
FIG. 13 is a data graph relates to cross-sectional profile of pit texture of SD-Ni45 metal-ceramic alloy cladding layer before sulfurization.

The three-dimensional morphology of the pit texture is as shown in FIG. 12, and the cross-sectional profile (in depth) of pit texture is as shown in FIG. 13. It can be seen from FIGS. 12 and 13 that texturing treatment can cause physical changes to surface of cladding layer. The pit formed can not only increase sulfurization area and sulfurization thickness of the surface of the cladding layer, but can also store wear debris and lubricating medium, reduce the wear of abrasive particles on the friction pair, and prevent the loss of lubricating medium.

Figure 14:
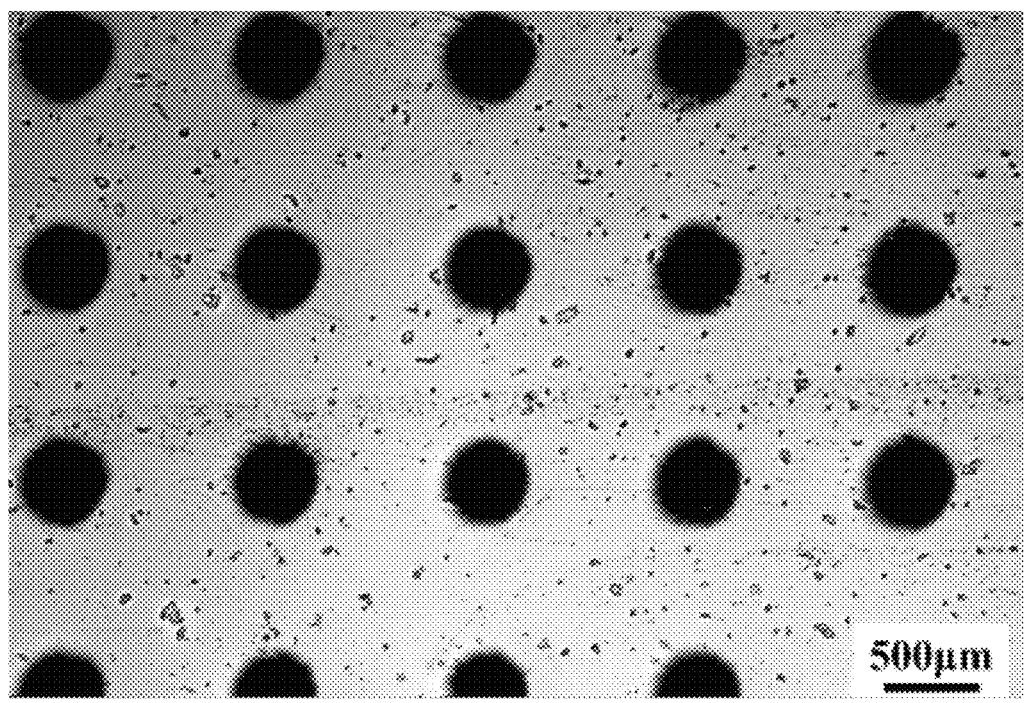
FIG. 14 is a morphology of pit texture of the SD-Ni45 metal-ceramic alloy cladding layer after sulfurization under Leica optical microscope.

The texture pattern is lightly grinded as well as polished in a single direction using 2000 grit sandpaper to eliminate the craters as well as burrs on the surface of the cladding layer, and is ultrasonically cleaned in anhydrous ethanol for 30 min to remove the residual polishing paste, oil stains and other stains on surface, and then is dried for use. The morphology of the pit texture after grinding under a Leica optical microscope is as shown in FIG. 14. After grinding, craters on surface of the cladding layer will be smoothed and the burrs will be disappeared.

(3) Sulfurization Treatment

The sample of cladding layer after the above-mentioned texturing treatment is subjected to sulfurization treatment. The parameters of sulfurization treatment are: voltage at 560V, holding temperature at 240° C., $H_2S$ gas flow rate at 24 sccm, and holding time at 2 h. After the sulfurization treatment, the micro-textured and ion-sulfurized SD-Ni45 metal-ceramic alloy cladding layer will be obtained.

Figure 15:
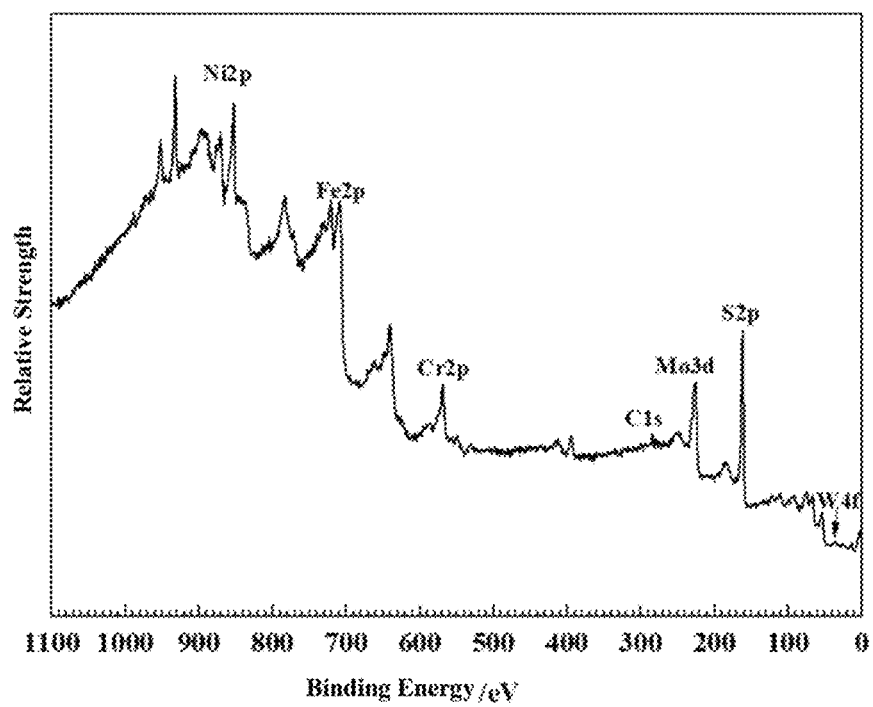
FIG. 15 is an XPS analysis diagram relates to internal material of pit texture of SD-Ni45 metal-ceramic alloy cladding layer after sulfurization.
Figure 16:
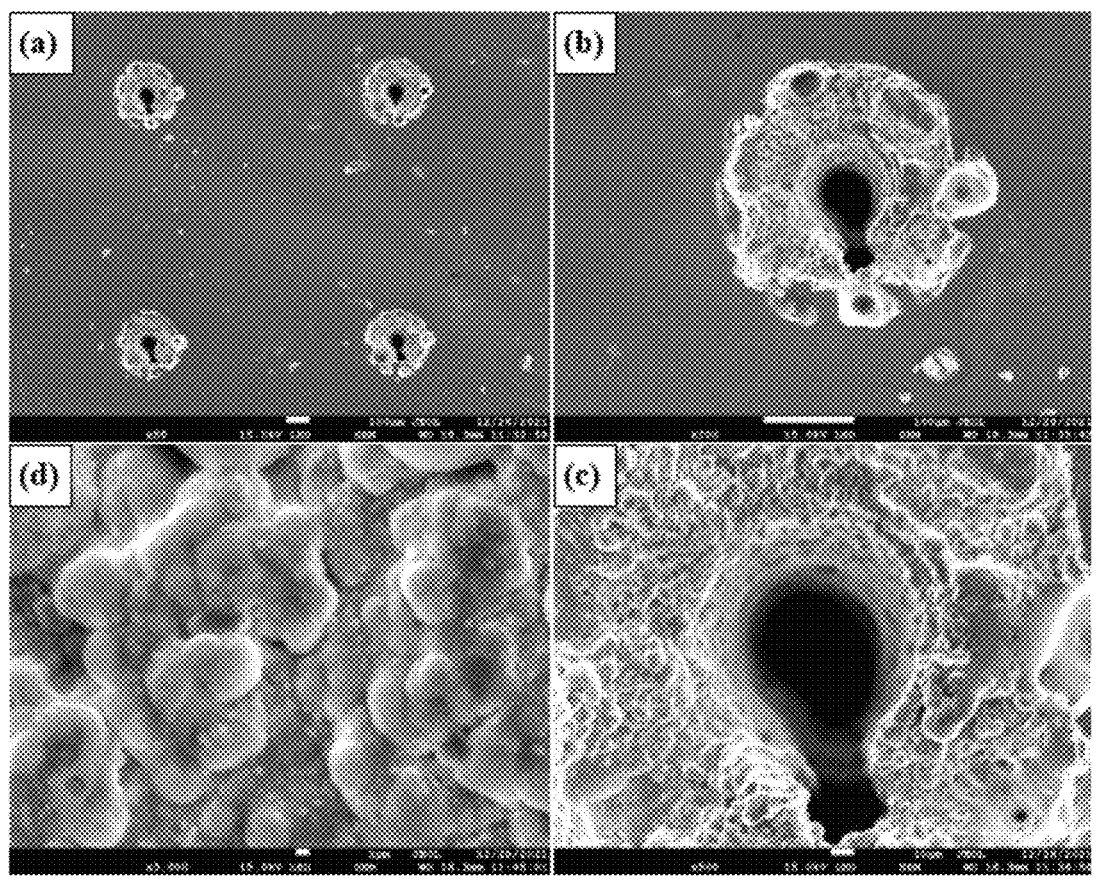
FIG. 16 is SEM images of pit texture of the SD-Ni45 metal-ceramic alloy cladding layer after sulfurization, wherein (a) is a low-magnification morphology of pit texture, (b) is morphology of a single circular pit and (c) as well as (d) are continuously enlarged internal morphologies of a single circular pit.

The XPS element analysis of the internal material of pit texture is as shown in FIG. 15. The SEM image of the pit texture is as shown in FIG. 16. It can be seen from FIGS. 15 and 16 that pit texture contains sulfides such as $MoS_2$ and FeS which proves success of sulfurization treatment.

Friction and Wear Test (1) Test 1

The dry friction test is performed on the micro-textured and ion-sulfurized CoCrFeNiMo high-entropy alloy cladding layer (pit pattern) prepared in Embodiment 1. At the same time, three control groups are set up: Control group A is non-ion-sulfurized cladding layer which is formed as the CoCrFeNiMo high-entropy alloy cladding layer by the laser cladding on the surface of Q235 steel; Control group B is commonly ion-sulfurized coating layer which is obtained by sulfurization of the CoCrFeNiMo high-entropy alloy cladding layer; Control group C is only textured cladding layer which is obtained by texturing the CoCrFeNiMo high-entropy alloy cladding layer.

The test instrument used is WTM-2E micro-friction and wear tester, and the parameters of the test are as follows: rotation speed at 500 r/min, rotation radius at 2.5 mm, load at 1.96N, and friction time at 1 h. The grinding ball is made of GCr15 material with a diameter of 5 mm.

Figure 17:
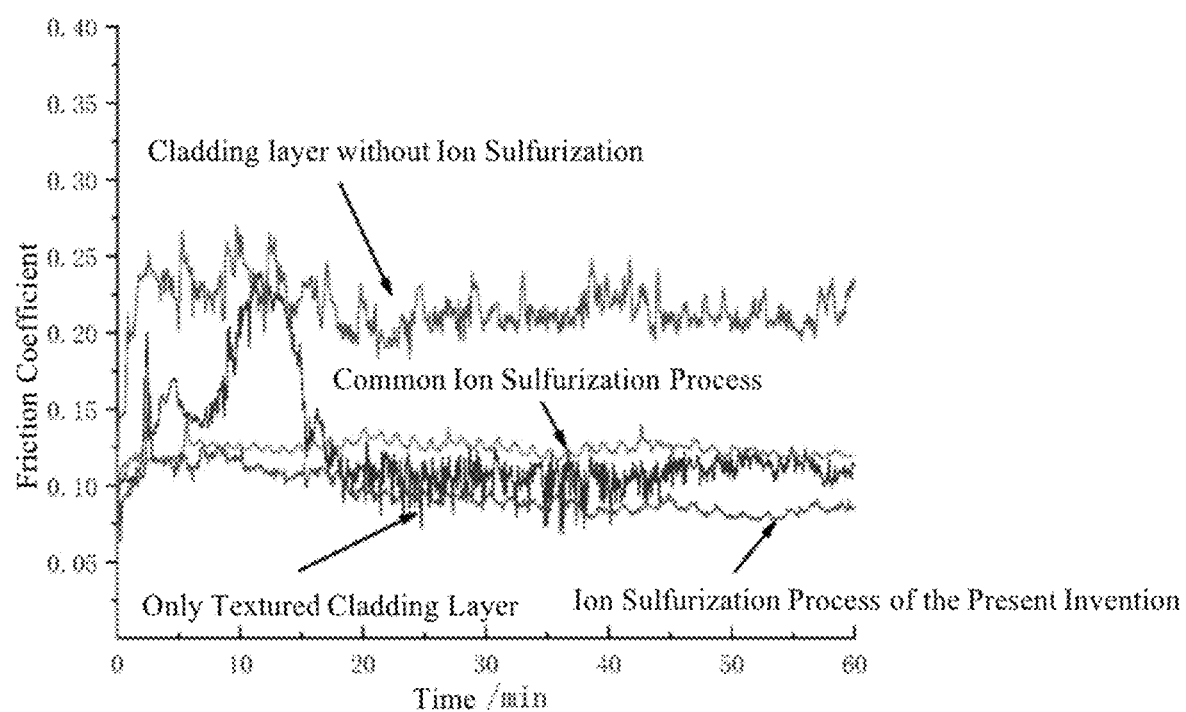
FIG. 17 is a graph showing variation of the friction coefficient of different cladding layers over time in Test 1.
Figure 18:
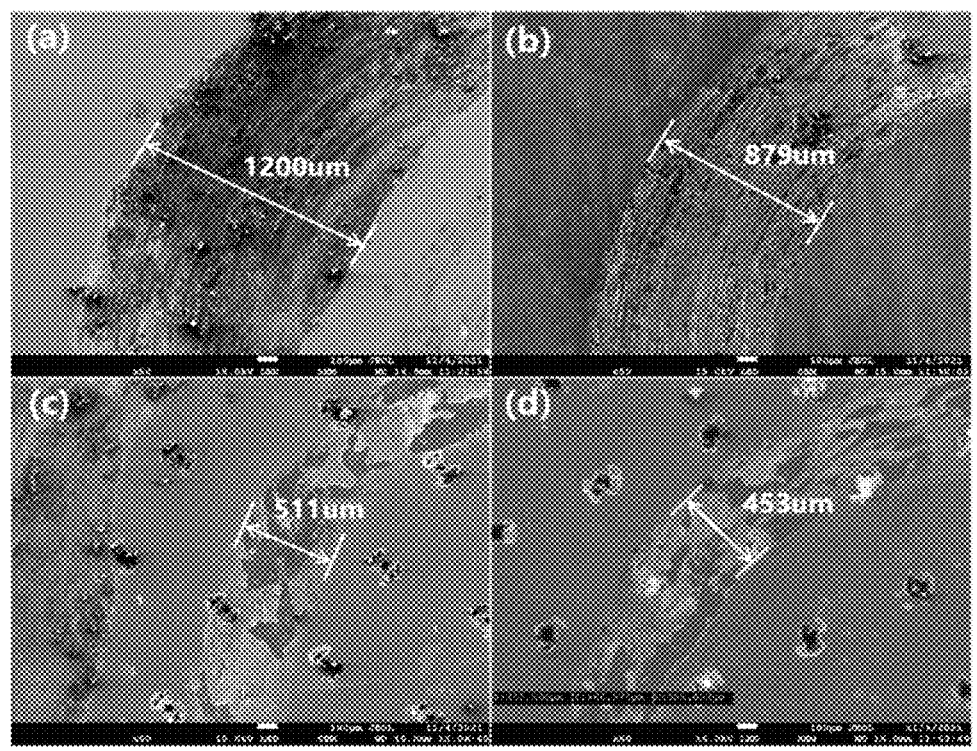
FIG. 18 is the SEM images relates to morphology of wear scar of different cladding layers in Test 1, wherein (a) is the morphology of wear scar of the cladding layer without ion sulfurization, (b) is the morphology of wear scar of the layer coated by common ion sulfurization process, (c) is the morphology of wear scar of the textured cladding layer and (d) is morphology of wear scar of micro-textured as well as ion-sulfurized CoCrFeNiMo high-entropy alloy cladding layer of present invention which its widths of the wear scar are 1200 μm, 879 μm, 511 μm and 453 μm in sequence.

The test results are as shown in FIGS. 17 and 18.

As is shown in FIG. 17, compared with the common ion sulfurization process, the friction coefficient of process of the present invention is lower which means that the alloy cladding layer prepared by present invention has more anti-wear property. At the same time, friction coefficient of the cladding layer is higher when ion sulfurization or texturing treatment is performed separately than when the two are combined. This shows that the friction coefficient of cladding layer can be further effectively reduced by simultaneously performing sulfurization and texturing treatment on cladding layer. There is a synergistic effect between ion sulfurization and texturing treatment.

As is shown in FIG. 18(a), there are large abrasive particles on the wear marks, the furrows of the wear marks are deep, and the wear weightlessness is large, which belong to abrasive wear. As is shown in FIG. 18(b), wear marks after sulfurization are relieved a lot, the number of abrasive particles is reduced, and furrows of wear marks are relatively shallow, and wear weightlessness is reduced. As is shown in FIG. 18(c), the abrasive particles and furrows on the wear marks after texturing treatment disappear which shows adhesive wear. As is shown in FIG. 18(d), wear marks by texturing and sulfurization are lighter and smaller with the smallest weightlessness.

(2) Test 2

The dry friction test is performed on micro-textured and ion-sulfurized SD-Ni45 metal-ceramic alloy cladding layer (i.e., the sulfurized film on the textured cladding Layer) prepared in Embodiment 2. At the same time, three control groups are set up: Control group A is the original cladding layer which is formed as SD-Ni45 metal-ceramic alloy cladding layer by laser cladding on the surface of Q235 steel; Control group B is the textured cladding layer which is obtained by texturing the SD-Ni45 metal-ceramic alloy cladding layer; Control group C is the sulfurized film on the original cladding layer which is obtained by sulfurization of SD-Ni45 metal-ceramic alloy cladding layer.

The test instrument used is CFT-I material surface performance comprehensive tester, and the parameters of the test are as follows: rotation speed at 500 r/min, rotation radius at 2.5 mm, load at 1.96N, and friction time at 1 h. The test method is rotational friction, and grinding ball is made of GCr15 material with a diameter of 5 mm.

Figure 19:
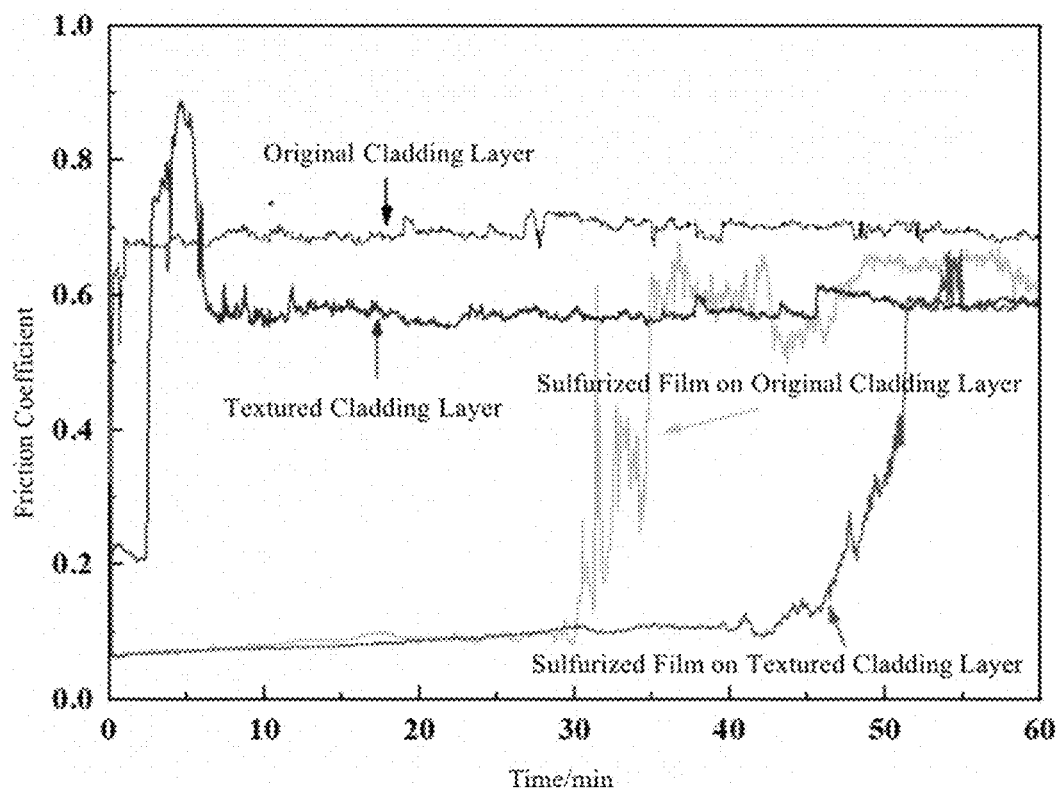
FIG. 19 is a graph showing variation of the friction coefficient of different cladding layers over time in Test 2.
Figure 20:
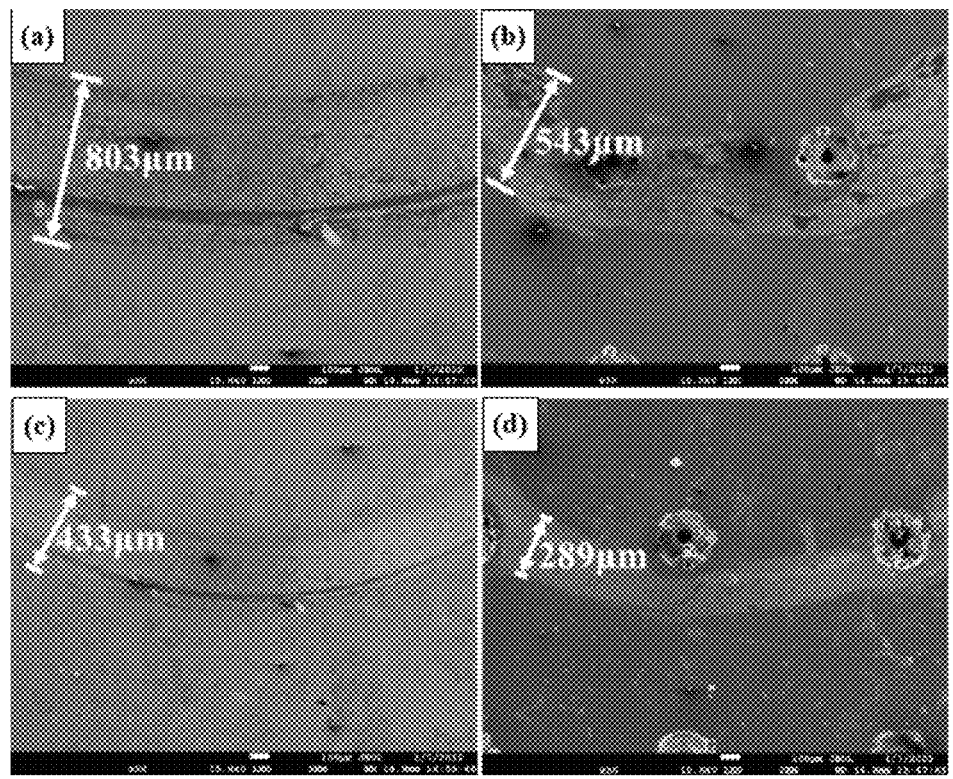
FIG. 20 is the SEM images relates to morphology of wear scar of different cladding layers in Test 2, wherein (a) is morphology of wear scar of the original cladding layer, (b) is morphology of wear scar of the textured cladding layer, (c) is morphology of wear scar of the sulfurized film on original cladding layer and (d) is morphology of wear scar of micro-textured and ion-sulfurized SD-Ni45 metal-ceramic alloy cladding layer of the present invention which its widths of the wear scar are 803 μm, 543 μm, 433 μm and 289 μm in sequence.

The test results are as shown in FIGS. 19 and 20.

It can be seen from FIG. 19 that both texturing and ion sulfurization can effectively reduce the friction coefficient, and the pre-textured sample can significantly extend the anti-friction effect of the ion sulfurization membrane and improve its service life. Therefore, micro-textured as well as ion-sulfurized SD-Ni45 metal-ceramic alloy cladding layer of the present invention has the most significant anti-friction effect.

It can be seen from FIG. 20 that both texturing and ion sulfurization can effectively reduce the width of wear marks. Since the circular pits play the role of continuously supplying lubricating sulfide and storing the grinding, micro-textured as well as ion-sulfurized SD-Ni45 metal-ceramic alloy cladding layer of the present invention can exhibit the smallest width of wear marks.

The above content is only a preferred embodiment of the present invention. For ordinary technicians in the art, the changes are obtained based on the exemplary embodiment and applying scope according to the idea of the present invention, the content of the specification should not be understood as a limitation of the present invention. Any modifications, improvements, equivalent replacements and the like, made within the spirit as well as principle of the present invention, shall all be included in the protection scope of the present invention.

What is claimed is:

1. A method for improving anti-friction and anti-wear properties of a substrate, the method comprising the steps of:
    first cladding alloy powder on the surface of substrate to form a cladding layer, and then performing a micro-texturing and sulfurization treatment in sequence on the cladding layer to form a micro-textured and ion-sulfurized cladding layer with anti-friction and anti-wear properties on the surface of substrate;
    an alloy powder is selected from the group consisting of CoCrFeNiMo high-entropy alloy and SD-Ni45 metal-ceramic alloy;
    a cladding is selected from laser cladding of which parameters are: laser power from 1500 to 5000 W, cladding speed from 200 to 800 mm/min and overlapping rate from 20 to 50%;
    the micro-texturing is performed on surface of cladding layer to form a pit array or parallel groove; and
    the sulfurization treatment adopts an ion sulfurization method, of which parameters are: voltage from 520 to 750V, holding temperature from 210 to 290° C., $H_2S$ gas flow rate from 20 to 30 sccm and holding time from 2 to 3 h,
    wherein a texture pattern in the form of parallel groove is textured by a laser marking machine in the following manner: marking speed from 100 to 1000 mm/s, power from 5 to 20W, marking number from 1 to 10 times, jumping speed at 3000 mm/s, Q frequency at 25 khz and Q release at 1 μs.

2. A method for improving anti-friction and anti-wear properties of a substrate according to claim 1, wherein a diameter of a pit in pit array is 100 to 500 μm, and a circle-center distance is 150 to 1500 μm;
    a width of the parallel groove is 50 to 200 μm, and a center distance is 50 to 500 μm.

3. A method for improving anti-friction and anti-wear properties of a substrate according to claim 1, wherein after micro-texturing is completed, surface of a micro-textured cladding layer should be grinded firstly before sulfurization treatment to eliminate burrs on the surface.

* * * * *